No. 615,478. Patented Dec. 6, 1898.
J. F. DAVENPORT.
AIR TIGHT VESSEL.
(Application filed May 14, 1898.)

(No Model.)

WITNESSES:
Thos. L. Ryan

INVENTOR.
John F. Davenport
by H. DuVal Brown
ATTORNEY.

THE NORRIS PETERS CO., PHOTO-LITHO., WASHINGTON, D. C.

UNITED STATES PATENT OFFICE.

JOHN F. DAVENPORT, OF MUNCIE, INDIANA, ASSIGNOR OF ONE-HALF TO GEORGE C. CARNES, OF SAME PLACE.

AIR-TIGHT VESSEL.

SPECIFICATION forming part of Letters Patent No. 615,478, dated December 6, 1898.

Application filed May 14, 1898. Serial No. 680,669. (No model.)

*To all whom it may concern:*

Be it known that I, JOHN F. DAVENPORT, a citizen of the United States, residing at Muncie, in the county of Delaware and State of Indiana, have invented a new and useful Air-Tight Vessel, of which the following is a specification.

My invention relates to a new and useful improvement in air-tight vessels; and it consists in the construction and arrangement of parts hereinafter described, and definitely pointed out in the claims.

The aim and purpose of this invention are to construct a vessel with a removable cover with an air-tight connection between the bucket or vessel and the cover secured in position by means of a bail-fastener, the bail being formed so that it can be also used as a handle. A further object is to construct the cover with lugs on which the bail rests and which can be used as handholds when it is desired to remove the cover. A bucket thus constructed, being air-tight when the cover is in place and also being provided with a handle, is especially useful for storing articles which should be kept air-tight and which are moved about—such, for instance, as butter, meat, or milk, and, in fact, almost all kinds of foods or provisions. These and other objects not hereinbefore mentioned are accomplished by the construction illustrated in the accompanying drawings, wherein like letters of reference indicate corresponding parts in the several views, and in which—

Figure 1:
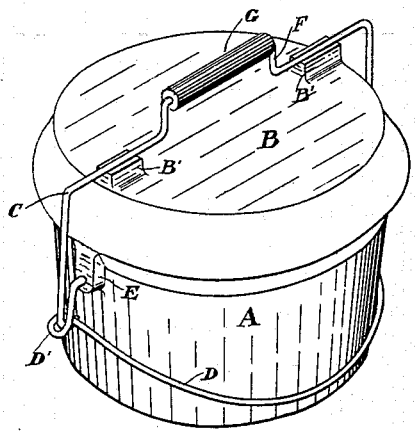
Figure 2:
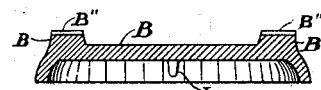
Figure 2:
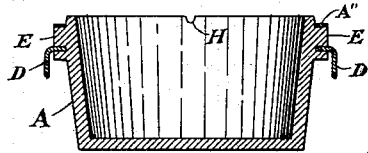
Figure 3:
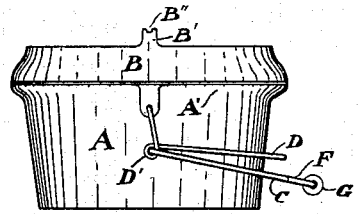
Figure 4:
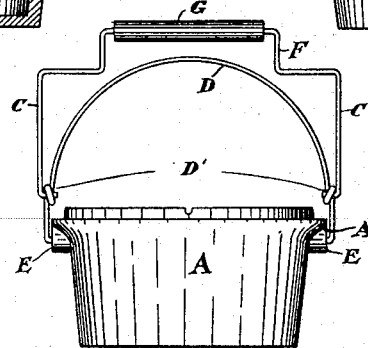

Figure 1 is a perspective view of my improved bucket. Fig. 2 is a vertical central longitudinal section through Fig. 1. Fig. 3 is a side elevation showing the bail removed from the cover and in position for the cover to be removed; and Fig. 4 is a side elevation with the cover removed and the bail and lever up, so that they can be used as a handle when it is desired to use the bucket without the cover.

In the drawings, A designates the bucket, and B the cover. The bucket is provided at its upper edge with an annular flange A', forming a seat for the cover. Resting in this seat is a gasket A'', preferably rubber, on which the cover is adapted to rest. The cover is provided on opposite sides of its top with two lugs B', one on each side and arranged in a parallel line. These lugs are provided with longitudinal grooves B'', and the lugs and grooves are so positioned that the bail, hereinafter described, will rest in the grooves when the cover is clamped on the bucket. These lugs also act as very convenient handholds for removing the cover.

The cover is secured on the bucket by means of the bail C and lever D. On opposite sides of the bucket, near its upper edge, are projections E, one on each side, which extend out from the annular flange A'. These projections are provided with an aperture, and the opposite ends of the lever D are inserted in these apertures, as shown in Fig. 2. This lever is formed of an integral piece having eyes D' formed therein on opposite sides of the bucket in which the ends of the bail C are secured. When the lever is down, as shown in Fig. 1, the bail is clamping the cover on the bucket, and when it is desired to remove the cover the clamp is raised, releasing the bail, which is thrown over the side of the bucket, as shown in Fig. 3.

The bail, as before described, passes over the top of the cover and rests in the grooves B'' in the lugs B'. By providing the lugs with the grooves the bail cannot work off. The portion of the bail between the lugs is provided with an upwardly-extending offset F, and on this offset portion is placed a roller-handhold G. By providing the bail with this offset the bail is utilized as a handle. At the same time it is used to clamp the cover in position. This I regard as an important feature of my invention, using the bail for a double purpose, making a bucket which is air-tight and also one that can be easily moved from place to place with the cover in position.

A further object in providing the cover with the lugs B, other than using them for a handhold, is that the bail can be made of sufficient length to pass over the upper edge of the bucket and the diameter of the bucket can be of any length. Another object is to raise the bail a distance above the cover, so that the offset portion can be used as a handle. The upper edge of the bucket is provided with a groove H, in which is adapted to fit a projection I on the cover. The groove and projection are so positioned that they will coincide when the cover is in such a position that the bail will rest in the grooves in the lugs.

Having thus described my invention, what I claim as new, and desire to secure by Letters Patent, is—

1. An air-tight vessel having a removable cover, lugs arranged on opposite sides on the top of the cover, a bail bearing on the lugs to hold the cover in position on the vessel having an upwardly-extending offset portion between the lugs adapted to be used as a handle when the bail is in use and a lever pivoted to the vessel and bail for operating the bail.

2. An air-tight vessel having a removable cover, lugs arranged on opposite sides on the top of the cover and having a longitudinal groove in their upper surface, a bail adapted to engage the grooves in the lugs to hold the cover in position on the vessel having an upwardly-extending offset portion between the lugs adapted to be used as a handle when the bail is in use and a lever pivoted to the vessel and bail for operating the bail.

3. An air-tight vessel having a removable cover, a bail bearing on the cover to hold the cover in position on the vessel having an upwardly-extending offset portion adapted to be used as a handle when the bail is in use and a lever pivoted to the bail having its opposite ends inserted in apertures on opposite sides of the vessel.

4. An air-tight vessel having a removable cover and a bail bearing on the cover adapted to hold the cover in position on the vessel and having an offset portion adapted to be used as a handle when the bail is in use and a lever pivoted to the vessel and bail for operating the bail.

In testimony whereof I affix my signature in the presence of two witnesses.

JOHN F. DAVENPORT.

In presence of—
THOMAS L. RYAN,
C. A. TAUGHINBAUGH.